United States Patent Office 2,701,068
Patented Feb. 1, 1955

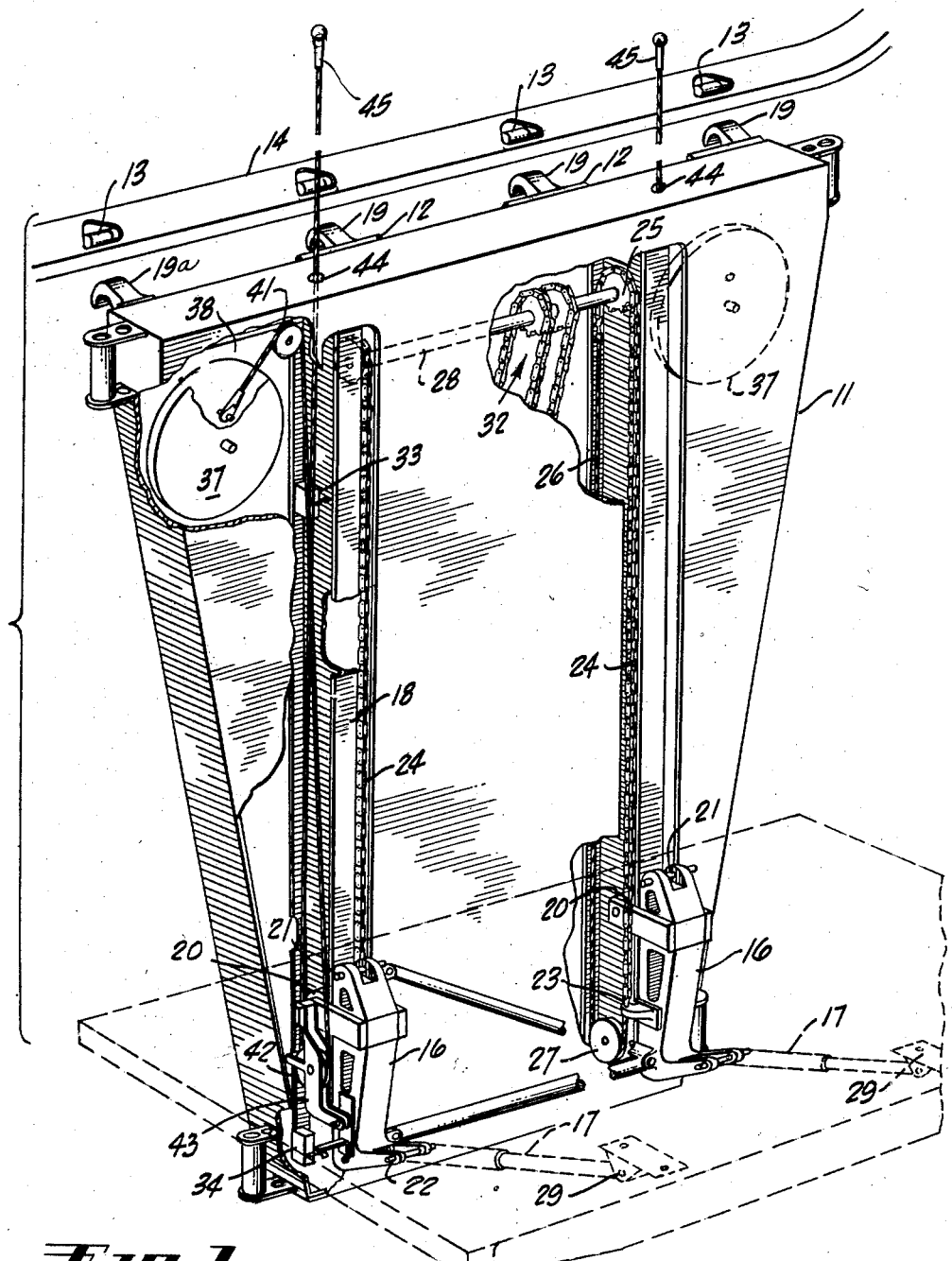

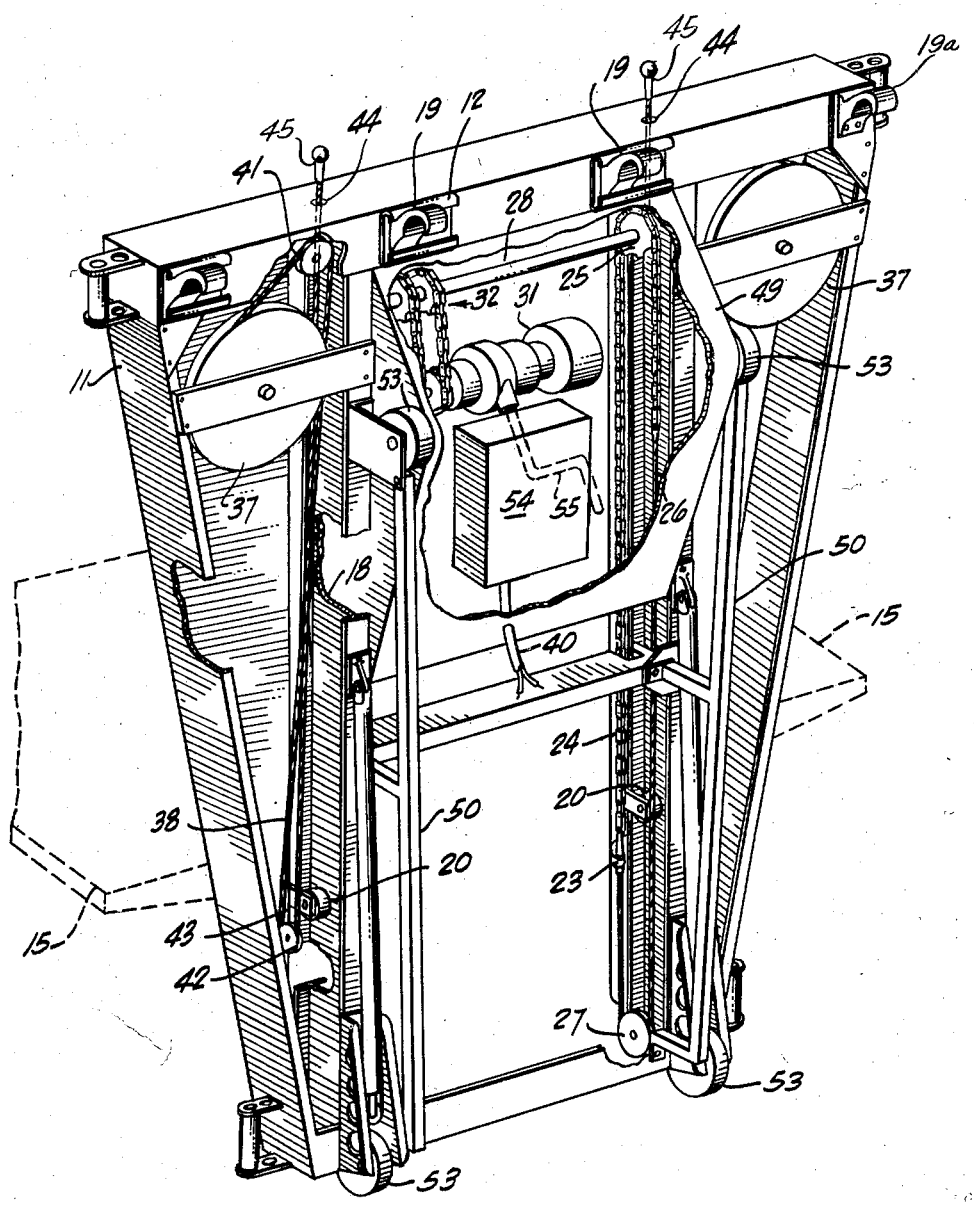

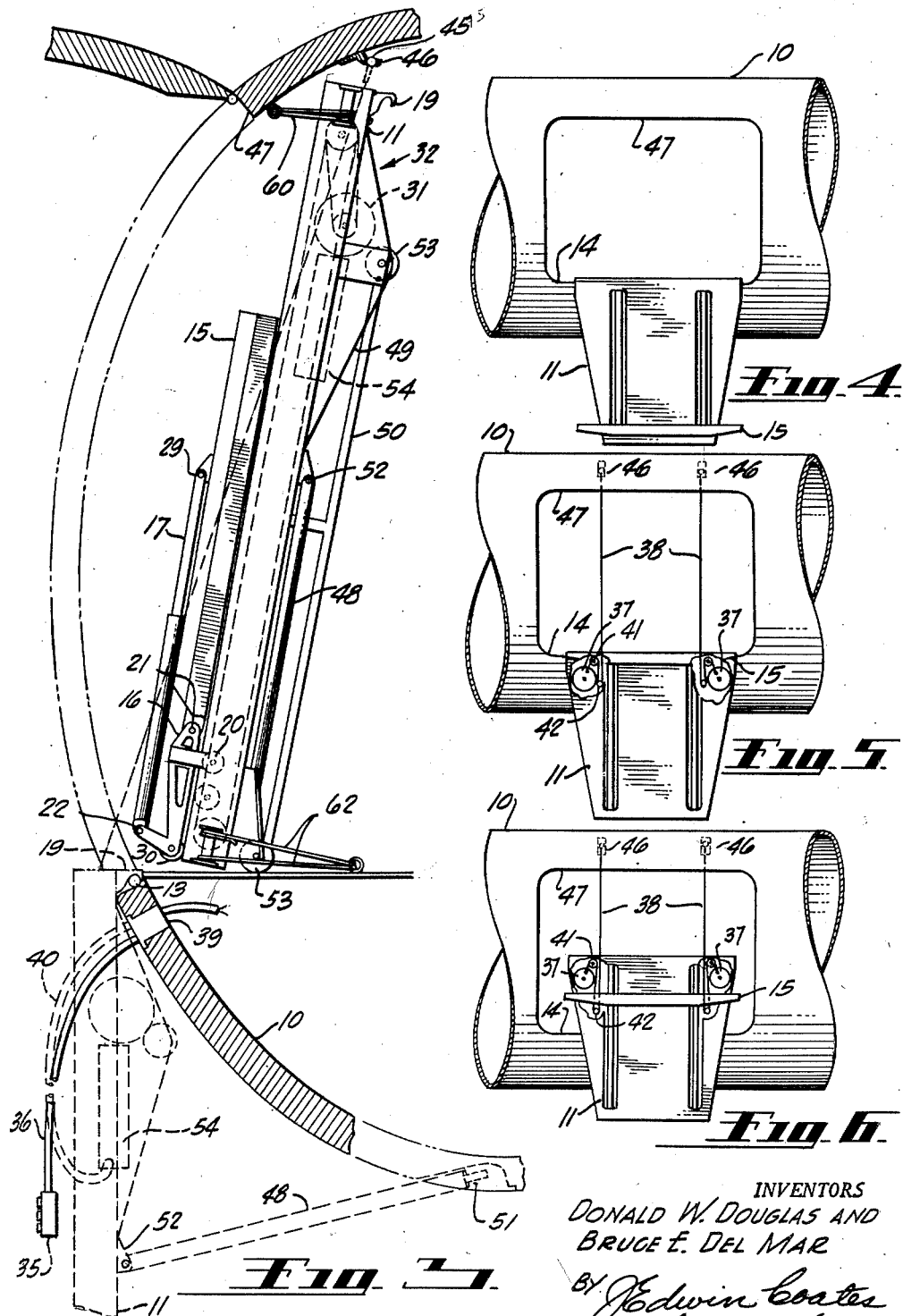

2,701,068

CARGO LOADING HOIST

Donald W. Douglas, Santa Monica, and Bruce E. Del Mar, Los Angeles, Calif., assignors to Douglas Aircraft Company, Inc., Santa Monica, Calif.

Application July 27, 1951, Serial No. 238,836

14 Claims. (Cl. 214—75)

This invention relates to apparatus for loading cargo and more particularly to a cargo loading hoist which incorporates means for lowering itself from an opening in a cargo container into its service position and which is likewise capable of retracting itself into a stowed position in said container.

As the size of cargo aircraft has increased the height of the cargo doorway above the ground has progressively increased, partly because larger fuselages are spaced higher above the ground and partly because modern tricycle landing gears have raised the rear portions of the fuselages where the main cargo doorways are normally located. These two factors have combined to greatly increase the time required to load cargo on large military or commercial transports and cargo planes.

In the past it has been customary to wheel large ramps or vehicle mounted hoists into position in order to permit transfer of cargo from the airplane to the ground or to other cargo handling facilities such as baggage carts, trucks or the like. The ramps are necessarily heavy, cumbersome and expensive. Moreover, such ramps are rarely suitable for all variety of aircraft types which present this loading problem. The vehicle mounted hoist is likewise cumbersome and expensive and often not adaptable to the needs of all aircraft.

The present invention provides a compact, efficient hoist which is carried within the airplane and therefore may be designed specifically to facilitate the loading and unloading of that particular airplane. Moreover, the basic features are readily adaptable to a variety of types of cargo carrying planes. No provision need be made to carry it onto and off the field as it remains neatly stowed in the aircraft when not in use.

The cargo loading assembly of the present invention basically is comprised of a frame upon which is mounted a vertically traversible cargo platform. Retractable means such as cables are contained within the frame and are adapted, when extended, to engage the upper portion of the cargo container at points above the upper marginal edge of the frame when the latter is located in its stowed or retracted position. The frame is then lowered over the edge of the doorway by elevating the platform until hooks carried by the frame engage suitable hook receptacles in said edge of the doorway. The cables are then detached and permitted to be withdrawn into the frame. The hoist is then in position for use. When it is desired to store the hoist the procedure is simply reversed and the hoist is retracted into its original substantially vertical stowed position. These operations are all carried out by actuation of such means as an electric or hydraulic motor contained within or carried by the frame.

Other objects and advantages will be apparent from the following description taken in connection with the accompanying drawings, in which:

Figure 1 is a fragmentary perspective view of the front portion of the apparatus with a portion of the frame removed to show more clearly the operation and construction of the hoist;

Figure 2 is a fragmentary perspective view of the rear portion of the apparatus, depicting the motor and other components of the hoist;

Figure 3 is a side elevation partly in section illustrating the hoist in its retracted or stowed position and further showing a portion of the hoist in dotted lines as it would appear in its service position;

Figure 4 is a front elevation showing the hoist in its service position with its platform in lowered position;

Figure 5 is a fragmentary front elevation showing the hoist, platform and cables in position just prior to retraction or after extension of the hoist; and Figure 6 is a front elevation illustrating the relationship of the cables, platform and frame when the hoist is partially retracted or extended.

Referring now to Figures 1 and 2, it will be seen that the cargo loading hoist of the present invention consists of a hoist frame or supporting member 11 that carries suspension means which are here shown as a plurality of hooks 19 and 19a. The hooks 19 are slidably mounted in corresponding slotted hook supports 12. This enables the horizontal position of the hooks to be shifted, thereby permitting them to readily engage a series of corresponding hook receptacles 13. The receptacles are here shown as a part of the lower marginal edge 14 of a cargo opening or doorway in the side of a cargo container such as the fuselage 10 of a cargo airplane. As the frame is lowered into position the hooks may be horizontally shifted to engage the receptacles and the frame is thereby secured and suspended in its service position.

Cargo carrying means such as a platform 15 are traversibly mounted on the frame by means of the carriage assembly 16 and telescopable struts 17. The carriage assembly is of standard construction and utilizes opposed rollers 20 and 30 which are pressed against a track or runway 18 by the weight of the platform 15 as is most clearly shown in Figure 3. The platform is rotatably connected to the upper portion of the carriage assembly by pins 21. The struts are likewise rotatable mounted on the lower portion of the carriage assembly by strut pins 22. Hinge brackets 29 are provided on the underside of the platform to receive the opposite ends of the telescopable struts to thereby permit the platform to be rotated upwardly into its stowed position.

As shown in Figure 1, a link 23 extends from the inner side of each carriage assembly 16 and is secured to a length of sprocket chain 24 which is carried by a drive sprocket 25. The remainder of an endless loop is completed by a length of cable 26 carried by a pulley wheel 27, since the cable will not be required to pass over the teeth of the sprocket 25. The pulley wheel is rotatably pinned to the frame or track while the sprocket wheel is mounted on a drive shaft 28 which is in turn operatively connected to a reversible electric motor 31 by a sprocket drive mechanism 32 as is best shown in Figure 2. The electric motor is in this instance secured to the back of the frame 11 by suitable mounting means.

In use as a cargo loading hoist, the motor is actuated to cause the sprocket chain to travel upwardly or downwardly in accordance with the operator's desires. The sprocket chain, being connected to link 23, causes the carriage assembly 16 and platform 15 to move correspondingly, thereby enabling the cargo to be elevated or lowered.

Limit switches 33 and 34, Figure 1, are provided at points representing maximum permissible upward and downward travel of the platform. When, for example, the carriage assembly trips the upper limit switch 33 a portion of the motor circuit is made inoperative, thereby preventing further upward movement of the platform. The operator then can move the platform downward by pressing the proper button on the control box 35, shown in Figure 3. However, depression of the "up" button will not cause elevation of the platform above the upper limit position. The control box is provided with an electrical conduit 36 leading to a junction box 39 and of sufficient length to permit control of the hoist from the ground or from within the cargo container. The junction box is in turn connected to a source of power located elsewhere in the airplane. An additional electrical conduit 40 leads from the junction box to the motor control 54.

Although an electric motor is preferred in order to actuate the platform it is apparent that hydraulic or manual actuation may be substituted for the system shown without departing from the novel features disclosed. Likewise worm gear, spur gear, piston and cylinder or like systems may be used in place of the sprocket drive mechanism 32 and other parts of the traversing mechanism.

As is shown in Figures 1, 2, and 3 a frame hoist or retraction mechanism serves as the means for retracting and extending the cargo loading assembly. In the embodiment shown, a pair of take up reels 37 or like automatic winding means are mounted on the frame 11 and are secured to one end of such elongate flexible connecting means as ropes, chains or cables 38 which are wound on the reels. The cables then pass over pulleys 41 which are secured to the upper part of the frame and then continue downwardly to sheave means such as pulleys 42 which are secured by brackets 43 to the carriage assemblies 16 as shown in Figure 1. The cables then are extended upwardly through sockets 44 or similar means for restraining and arresting the opposite ends of the cables against further retraction into the frame. In the present embodiment the opposite or upper ends of the cables are provided with bulbous enlargements 45 for engagement with sockets 44. For purposes of clarity the bulbous enlargements are shown in Figures 1 and 2 as being withdrawn from their corresponding sockets.

The motor guards 49 and guide rails 50 of Figure 2 serve to provide a sliding contact with the lower marginal edge 14 of the cargo opening, thereby protecting the motor and other parts against damage when the frame is retracted or extended. The wheels 53 are provided to expedite movement of the frame when it is to be moved on the ground or on the cargo container floor.

When the platform is actuated downwardly for cargo handling purposes the pulleys 42 travel with the platform and therefore cause the cables 38 to be withdrawn from the take up reels 37. When the platform is elevated the cables are again withdrawn into the reels.

In order to hoist the cargo loading assembly into its stowed position the sequence of steps depicted in Figures 4, 5, and 6 is followed. Assuming the platform 15 is positioned as shown in Figure 4, then it must first be elevated, as above described, to its maximum up position as illustrated in Figure 5. The frame braces 48, shown in dotted lines in Figure 3, are then removed from their brace sockets or connections 51 and rotated downwardly about their pivot brackets 52 into their stowed position parallel to the rear surface of the frame 11 as illustrated in Figure 3 in full lines. The bulbous ends 45 of the cables 38 are grasped and the cables are withdrawn from the take up reels 37 until the bulbous ends may be fitted in the slotted suspension receptacles 46 which are in this case fixed to the fuselage interior at points near the upper marginal edge 47 of the cargo opening. This operation withdraws substantially all of the cable from each reel, as is indicated in Figure 5 by the fact that the cables are shown extending radially from their respective reels.

The platform 15 is then lowered relative to the frame 11 and this operation causes the frame to move upwardly, as illustrated in Figure 6, as a result of increasing the distance between pulleys 41 and 42. This hoisting action will not occur until all of the cable is withdrawn from each reel 37 since the reels must serve as fixed stations to which each cable 38 is connected at one end. The total length of cable necessary is determined by a consideration of such factors as length of travel of the platform, dimensions of the cargo opening, the vertical length of the frame and the height to which it is desired to raise the assembly.

In the present embodiment the lowering of the platform is continued until the assembly reaches its stowed position shown in Figure 3 in full lines. The platform 15 is then folded against the frame 11 and the entire assembly may be lashed in stowed position by means of lashings 60 and 62 to prevent movement in flight. In order to extend the assembly into working or service position the above described procedure is simply reversed. In the event of power failure the retraction mechanism and platform may be hand operated by use of the hand crank 55 shown in dotted lines in Figure 2.

Although the embodiment herein described is designed for use with a cargo plane having a cargo opening in its side, it is apparent that the hoist may readily be adapted for use with planes having cargo openings in the underside or nose of its fuselage. Other adaptations may require the use of a lesser or greater number of cables, take up reels, pulleys and other elements depending upon the weight and cargo capacity desired. Likewise other types of platform struts and frame braces may be substituted without departing from the scope of this application.

Although the now preferred embodiment of the present invention has been illustrated and described it is to be understood that the invention need not be limited thereto for it is susceptible to changes in form, detail and application within the scope of the appended claims.

We claim:

1. A cargo loading hoist extensible from an opening in a cargo container, comprising: a supporting member adapted to be connected to the marginal edge of said cargo container opening; cargo carrying means; vertical traversing means mounted on said member; means connecting said carrying means to said traversing means; means mounted on said member for actuation of said traversing means; and retractable means carried by said member for connection to said container and actuable by said traversing means; whereby said supporting member may be extended from said opening and withdrawn into said container by actuating said traversing means.

2. A cargo loading assembly capable of being mounted in an airplane cargo container for extension from a cargo door opening into loading position and for retraction into said container for storage, comprising: a support frame; a traversing mechanism mounted on said frame for upward and downward movement; a cargo carrier connected to said traversing mechanism for vertical movement therewith; an actuating mechanism mounted on said frame for actuation of said traversing mechanism; and a hoist mechanism connected at one end to said frame and disengageably connectible at its other end to said container and operable by movement of said traversing mechanism for extension and retraction of said assembly when said hoist mechanism is in its connected position.

3. A collapsible cargo loading attachment capable of being mounted in a cargo container for extension from a cargo container opening into loading position and for retraction into said container for storage, comprising: a vertically disposed support frame; means for suspending said support frame from said opening when in loading position; a vertical traverse mechanism mounted on said frame; a cargo carrier connected to said traverse mechanism for vertical displacement by said traverse mechanism; an actuating unit carried by said frame; a power transmitting drive operatively connecting said unit and said traverse mechanism; a frame hoist carried by said frame for connection to said container, said hoist being operable by said traverse mechanism to raise and lower said attachment when said hoist is connected to said container; said hoist, traverse mechanism, and frame being so organized and arranged that said attachment may be extended by raising said cargo carrier relative to said frame and may be retracted by lowering said cargo carrier relative to said frame when said hoist is connected to said container.

4. A collapsible cargo loading attachment capable of being mounted in a cargo container for extension from a cargo container opening into loading position and for retraction into said container for storage, comprising: a vertically disposed support frame; means for suspending said support frame from said opening when in loading position; a vertical traverse mechanism mounted on said frame; a cargo carrier connected to said traverse mechanism for vertical displacement by said traverse mechanism; an actuating unit carried by said frame; a power transmitting drive operatively connecting said unit and said traverse mechanism; elongate flexible connecting means for extension from and retraction into said frame; automatic winding means carried by said frame, said winding means being connected to one end of said connecting means; a sheave means connected to said cargo carrier for transmission of force to said connecting means; socket means in said frame for reception and restraint of the opposite end of said connecting means when the latter is retracted; and means for securing the opposite end of said connecting means to said cargo container when the former is extended; whereby said loading attachment may be drawn into said opening or extended therefrom when said connecting means is extended and secured to said container by operation of said actuation unit.

5. A cargo loading assembly capable of being mounted in a cargo plane for extension from a door opening in a cargo container into loading position and for retraction into said container for storage, comprising: a support frame; a traversing mechanism mounted on said frame for upward and downward movement; a cargo carrier connected to said traversing mechanism for vertical movement therewith; an actuating mechanism mounted on said frame for actuation of said traversing mechanism; elongate flexible connecting means for extension from and retraction into said frame; automatic winding means carried by said frame, said winding means being connected to one end of said connecting means; a sheave means connected to said cargo carrier for transmission of force to said connecting means; socket means in said frame for reception and restraint of the opposite end of said connecting means when the latter is retracted; and means for securing the opposite end of said connecting means to said cargo container when the former is extended; whereby said loading attachment may be drawn into said opening or extended therefrom when said connecting means is extended and secured to said container by operation of said actuation unit.

6. In a cargo loading assembly including a frame and a vertically traversible cargo platform extending horizontally from said frame, a hoist mechanism operated by the movement of said platform relative to said frame for extending and retracting said assembly from a cargo container opening, comprising the combination of: retractable connecting means enlarged at one end and adapted to be secured to the upper marginal area of said container opening; sheave means rotatably connected to said platform; automatic winding means carried by said frame, said winding means being adapted to receive the opposite end of said connecting means; said connecting means being in contact with said sheave means at a point intermediate the opposite ends of said connecting means; and socket means formed in said frame to receive and retain the enlarged ends of said connecting means against the pull of said winding means when said end of said connecting means is not secured to said upper marginal area.

7. A cargo loading hoist for use in loading and unloading a cargo container, comprising: a frame adapted to be suspended from the marginal edge of a cargo container opening; a cargo carrier traversably mounted on said frame for upward and downward movement; traversing means to actuate said cargo carrier; and tension bearing means adapted to disengageably connect said frame to the interior of said cargo container; said tension means being operatively connected to said traversing means to retract said cargo hoist into said cargo container and to extend said cargo hoist from said container in response to operation of said traversing means.

8. A cargo loading hoist for use in transfer of cargo to and from a cargo container, comprising: a frame adapted to be suspended from the marginal edge of an opening in said cargo container; a cargo carrier traversably mounted on said frame; a take up means mounted on said frame; tension bearing means secured at one end to said take up means and operatively connected to said carrier at a point intermediate said one end and its opposite end; said opposite end being adapted for connection to the interior of said cargo container to retract said cargo hoist into said container and to extend said cargo hoist from said cargo container in response to operation of said carrier.

9. In a cargo loading hoist, apparatus for retracting said hoist into an opening in a cargo container and for extending said hoist from said container, comprising: a takeup assembly mounted on said hoist; a tensile member secured at one end to said assembly and adapted, when withdrawn from said assembly, for connection to the interior of said cargo container; a traversing mechanism forming a part of said hoist and operatively connected to said tensile member at least when said tensile member is secured at one end to the interior of the container; said hoist being retracted into said container and extended therefrom by actuation of said traversing mechanism to force the hoist up or down once all slack in said tensile member is withdrawn from said take-up assembly.

10. A cargo loading hoist for use in transfer of cargo to and from a cargo container, comprising: a hoist frame adapted to be suspended from the marginal edge of an opening in said cargo container; a cargo carrier traversably mounted on said frame; tension bearing means connected at one end to said frame and adapted at its other end for connection to the interior portion of said cargo container; means operatively connecting said tension bearing means to said traversable cargo carrier to elevate said hoist when said carrier is traversed downwardly relative to said frame after taking up the slack in said tension bearing means and to lower said hoist when said carrier is traversed upwardly relative to said frame until slack again exists in said tension bearing means.

11. A foldable cargo loading hoist for use in transfer of cargo to and from a cargo container, comprising: a frame adapted to be suspended from the marginal edge of an opening in said cargo container; a carriage assembly traversably mounted on said frame for upward and downward movement; a foldable cargo carrier rotatably mounted on said carriage assembly so that said carrier may be extended outwardly from said frame for loading cargo and may also be folded in juxtaposition to said frame for compactly storing said hoist; traversing means vertically mounted on said frame to actuate said carriage assembly; an actuating unit carried by said frame, the lengthwise axis of said unit being disposed parallel to the face of said frame on which said carrier is traversably mounted; and a power transmitting drive operatively connecting said unit and said traversing means; the aforesaid components of said hoist being thus arranged so as to form a compact unit in said hoist's loading condition and an even more compact unit when said hoist is folded for storage.

12. A foldable cargo loading hoist for use in transfer of cargo to and from a cargo container, comprising: a frame adapted to be suspended from the marginal edge of an opening in said cargo container; a carriage assembly traversably mounted on said frame for upward and downward movement; a foldable cargo carrier rotatably mounted on said carriage assembly so that said carrier may be extended outwardly from said frame for loading cargo and may also be folded in juxtaposition to said frame for compactly stowing said hoist; traversing means vertically mounted on said frame to actuate said carriage assembly; an actuating unit carried by said frame; a power transmitting drive operatively connecting said unit and said traversing means; at least one elongate flexible connecting means; means carried by said cargo container for securing one end of each of said connecting means; and means operatively connecting the other end of each of said connecting means to said actuating unit, whereby actuation of said unit operates to extend and retract said hoist from and into said cargo opening and to also cause the vertical movement of said cargo carrier relative to said frame.

13. A cargo loading hoist for use in transfer of cargo to and from a cargo container, comprising: a frame adapted to be suspended from the marginal edge of an opening in said cargo container; a cargo carrier traversably mounted on said frame and adapted to be folded against said frame for compact storage of said hoist; vertical traversing means mounted on said frame for actuation of said cargo carrier; an actuating unit carried by said frame; a power transmitting drive operatively connecting said unit and said traversing means; and elongate tension-bearing means adapted to be secured at one end to said cargo container and adapted at the other end for operative connection to said actuating unit, whereby, when said tension-bearing means are operatively connected, actuation of said unit causes retraction or extension of said hoist into or from said cargo container.

14. A cargo loading hoist capable of being mounted in a cargo container for extension from a cargo container opening into loading position and for retraction into said container for storage, comprising: a support frame adapted for connection to said container adjacent its opening; a traversing mechanism mounted on said frame for upward and downward movement; a cargo carrier assembly connected to said traversing mechanism for vertical movement therewith; an actuating mechanism mounted on said frame and operatively connected to said traversing mechanism for actuation thereof; securing means on said cargo container; and tension-bearing means adapted for operative connection between said securing means and said carrier assembly whereby downward movement of said carrier assembly is at least partially restrained when said tension-bearing means is connected and whereby actuation of said traversing mechanism operates to retract said hoist into storage position and extend said hoist into loading position.

(References on following page)

References Cited in the file of this patent

UNITED STATES PATENTS

| | | | |
|---|---|---|---|
| 2,203,310 | Shonnard | June 4, | 1940 |
| 2,356,155 | Fogle | Aug. 22, | 1944 |
| 2,379,599 | Smith | July 3, | 1945 |
| 2,411,647 | Bonnell et al. | Nov. 26, | 1946 |
| 2,412,412 | Meili | Dec. 10, | 1946 |
| 2,418,494 | Anthony et al. | Apr. 8, | 1947 |
| 2,498,161 | Hamilton | Feb. 21, | 1950 |
| 2,523,723 | Santee et al. | Sept. 26, | 1950 |
| 2,531,263 | Fink et al. | Nov. 21, | 1950 |
| 2,583,557 | Foy | Jan. 29, | 1952 |
| 2,634,000 | Ulrich | Apr. 7, | 1953 |
| 2,635,771 | Black | Apr. 21, | 1953 |